United States Patent Office 3,393,066
Patented July 16, 1968

3,393,066
PROCESS FOR REDUCTION OF IRON ORE IN STAGED FLUID BEDS WITHOUT BOGGING
Francis Xavier Mayer, Baton Rouge, La., assignor to Esso Research and Engineering Company, a corporation of Delaware
No Drawing. Continuation-in-part of application Ser. No. 398,073, Sept. 21, 1964. This application Dec. 31, 1964, Ser. No. 422,559
7 Claims. (Cl. 75—26)

ABSTRACT OF THE DISCLOSURE

Fluidized beds of reduced iron ore particles tend to agglomerate or bog at high temperatures, especially temperatures above about 1300° F. Bogging can be minimized by adding to ferrous reduction zones small amounts of oxides or carbonates of calcium or magnesium as anti-bogging agents. The agents are added in fine critical particle sizes less than about 48 mesh.

---

This invention relates to the production of sponge iron by reaction of oxidic iron ores by contact with reducing gases. In particular, it relates to an improved iron ore reduction process wherein fluidized iron ores are metallized by direct contact with hydrogen, carbon monoxide, or mixtures of these and other gases.

This application is a continuation-in-part of U.S. application Ser. No. 398,073, filed Sept. 21, 1964, now abandoned.

The production of spinge iron by reduction of oxidic iron ores, i.e., ores containing or consisting essentially of oxides of iron, in beds fluidized by upwardly flowing gases, at temperatures ranging generally from about 1000° F. to about 1800° F., is well known to the art. Moreover, such processes wherein the fluidized beds are staged as separate reduction zones, and the zones operated at the same or different elevated temperatures generally within this given range is also known.

In a typical staged fluidized iron ore reduction process, iron oxides are, e.g., provided: in a first fluidized bed wherein the oxides are reduced from the ferric state to magnetic oxide of iron; in a second fluidized bed wherein magnetic oxide of iron is reduced to ferrous oxide; and in a third zone wherein ferrous oxide is reduced to metallic iron. The separate stages may be operated at the same or different elevated temperatures, and one or a plurality of ferric reduction zones or ferrous reduction zones may be provided. A burning zone wherein the reducing gas, e.g., hydrogen, is burned with an oxygen-containing gas, e.g., air, may be provided or may be combined with a ferric reduction zone to provide heat for the reaction.

In all such processes it is desired to have sufficiently high temperature to achieve maximum reduction, and to achieve same smoothly and efficiently. One would expect to achieve maximum reduction by increasing the temperature of the reaction, and for the reaction to proceed at a faster rate with increasing temperature. However, high temperatures can produce bogging or, if the temperature becomes sufficiently high, sintering of the ore.

Bogging is a phenomenon manifested by a "stickiness" occurring at the surfaces of the individual solids iron ore particles. It is postulated, and fairly well supported, that the surfaces of the individual ore particles become covered, in whole or in part dependent on temperature, with crystalline forms of iron. These crystalline forms, microscopic in character, often take on the appearance of nodules or "whiskers" extending outwardly from the individual particles. The microscopic appearance of the individual ore particles with projecting deposits or nodular growths, in fact, is not too different from that of certain forms of vegetable or plant leaves which contain potassium oxalate or calcium carbonate growths. Because of these claw-like projections, or reactive spots, the particles tend to attach one to another upon contact so that individual iron ore particles cling or weld together to form aggregates or agglomerates. Such phenomenon militates against proper fluidization of the particles and hence bogging, or loss of fluidization of the bed occurs. This phenomenon is not unlike sintering of the particles in its effect, but differs from sintering inasmuch as the latter is caused by an actual melting of the reduced iron upon the surfaces of the particles, this causing the individual particles to cling one to another to also produce agglomeration.

Bogging, then, is a very undesirable phenomenon and the tendency of an ore to bog increases with increasing temperature, especially as the degree of metallization increases. High temperatures ranging just below that which will produce sintering—i.e., about 1800° F.—are desired, however, inasmuch as more efficient reduction and faster rate of reaction are achieved. This, then, presents a dilemma for, on the one hand, the higher the temperature the more acute the tendency toward bogging and, on the other, the lower the temperature the less the efficiency of the process. With certain ores, e.g., Carol Lake ore, the tendency to bog at elevated temperature is especially severe, and for this reason it is difficult to treat this and some other ores in a fluidized iron ore reduction process.

The present invention has for its primary objective a solution of the problem of bogging. In particular, its objective is to provide the art with a simplified, new and novel fluidized iron ore reduction process wherein bogging is inhibited and, in some cases, completely eliminated so that more elevated temperatures can be used and the process operated more effectively for longer periods. A further object is to provide such process wherein significant amounts of sulfur are eliminated from iron ores and product quality improved. A specific object is to provide an improved process wherein the tendency toward bogging is inhibited or eliminated in the several stages, particularly in the ferrous reduction stage, of a fluidized iron ore reduction process wherein oxidic iron ores are treated with a reducing gas, or gases, to successively reduce the iron oxides to lower stages of oxidation; and finally to metallic iron. An even more specific object relates to such process providing a series of staged reaction zones wherein a significant portion of hydrogen is used as the reducing gas, and especially wherein hydrogen is burned in direct contact with the iron ore.

These and other objects are achieved in accordance with the present invention which contemplates the use of a novel class of agents or additives added to or otherwise mixed with fluidized oxidic iron ore in a reduction process, even in very minor or minute concentrations, to inhibit or prevent bogging of the particulate ore. It has thus been found that small quantities of very finely ground alkaline earth metal oxides and carbonates, or mixtures thereof, can be directly added to a fluidized iron ore reduction bed, or admixed with an iron ore feed, to inhibit and in some instances to entirely prevent bogging.

The reasons for the effectiveness of these added agents in inhibiting or preventing bogging are not fully understood. While applicant does not desire to be bound by any theory of mechanism, it is believed that the novel additives of this invention chemically react with, alter, or otherwise poison the nodular growths or active sites on the surface of the individual iron ore particles which form as temperature is increased. Because of this poisoning effect, the normal tendency of the particles to stick or bridge together upon physical contact one particle with another is inhibited or eliminated.

It is generally desirable to employ concentrations of the additives ranging at least from about 0.05 to about 5.0 percent, based on the weight of the iron ore feed. Greater concentrations can be used if desired; but, except in the instance of very stubborn ores, such amounts of additives are not required. In most instances it is found suitable to employ concentrations ranging from about 0.1 to about 1.5 percent of the additive, and even more preferably from about 0.5 to 1 percent, based on the weight of iron ore.

Additives suitable for use in accordance with the present invention include oxides and carbonates of Group IIA metals of the Periodic Chart of the Elements, i.e., alkaline earth metal oxides and carbonates whether added to the process ab initio or generated in situ. Exemplary of such compounds are beryllium carbonate, beryllium oxide, barium oxide, barium carbonate, strontium oxide, and the like, and including mixtures of any of such compounds with other substances or with each other.

Particularly preferred classes of compounds, because of their extremely high effectiveness in reducing bogs, even when used in very small concentrations, are the carbonates and oxides of calcium and magnesium. The oxides and carbonates of magnesium are outstanding in their effectiveness even when used in minute concentrations. These preferred classes of compounds, particularly the oxides and carbonates of magnesium, are also outstanding from the cost-effectiveness standpoint and are readily available as stable articles of commerce.

In a fluidized iron ore reduction process, especially when operated at the higher temperatures, it is known that added alkaline earth metal carbonates thermally decompose to oxides, and it has been observed that process operation is generally at least slightly improved after the conversion has taken place. The effect is even more marked in the use of the carbonates of calcium and magnesium. In any event, it is apparent that the addition of any alkaline earth metal compound which will provide the oxide in situ will provide the desired benefits. Hence, the addition of such compounds, e.g., oxalates and the like, are within the scope of the present invention.

To achieve the benefits of this invention, particularly optimum benefits, it is essential that the additive be provided within the fluidized iron ore in a very finely divided state. When the effective particle size is coarser than about 14 mesh (Tyler screen), the additives are unsuitable for achieving their intended purpose. For any given additive to be effective, it is contemplated that the added mixture contain a sufficiently large number of particles of proper particle size to provide the necessary concentrations of fine particles within the fluidized iron ore bed. In this regard, while the very finely ground oxides and carbonates of magnesium are somewhat effective even at very low concentrations—e.g., about 0.05—generally about ten times as much of the oxides and carbonates of calcium at the same particle size is required. For other alkaline earth metal oxides and carbonates, concentrations should be even greater to achieve the same degree of effectiveness. It is very preferable, in any event, that the particle size should be much finer than 14 mesh and should range from about 48 mesh (297 microns) and finer. Considerably better results, however, are achieved when the particle size is even finer and ranges from about 325 mesh (105 microns) and finer. Even greater benefits are obtained when the fineness is measured down in the micron range, and even in the sub micron particle size range. In fact, it has been found that generally the finer the particle size the more effective is a given additive in the prevention of bogging.

The additives of this invention, including especially those preferred classes, are preferably added directly to the ferrous reduction zone or bed wherein the tendency to bog is the most severe. In certain circumstances, however, it may be desirable to add all or a portion of the additives to the ferric zone of bed, or to a burning bed, which precedes other beds or zones, and wherein temperatures can range from about 1000° F. to about 1800° F. A burning bed is one wherein a portion of the hydrogen is burned with an oxygen-containing gas, e.g., air, so that the heats of combustion are imparted to the fluidized iron ore bed. The combustion can be under oxidizing or reducing conditions, i.e., in an excess or deficiency of the oxygen-containing gas, so that the oxidic iron ore will be oxidized or reduced. Where the bed is operated under reducing conditions, it constitutes also a ferric reduction zone and can be succeeded by an addtional ferric reduction zone, or zones, and by a ferrous reduction zone, or zones. In certain circumstances, e.g., wherein the ore contains undesirable sulfur or sulfides, however, it is preferred to operate the burning bed under oxidizing conditions to remove the sulfur. The burning bed in such circumstances is followed by ferric and ferrous reduction zones, and at least some of the additive carries through the process to the ferrous reduction zone, or zones, wherein bogging is the most severe. Moreover, the preferred class of additives provides additional benefits inasmuch as they remain within the sponge iron product to act as a fluxing agent in the final reduction, as in a blast furnace for making steel. This is indeed a fortuitous advantage for fluxes generally have not only proven ineffective as additives in the present process but have even proven detrimental inasmuch as they not only failed to decrease the bogging tendency but promoted bogging. In any event, however, if desired the additives can be removed by benefication after the reduction. A further advantage of this invention is that decrepitation, or the tendency of the ore to produce fines, is lessened by the presence of the additives. Furthermore, scale and harmful deposits are virtually eliminated.

In a particularly preferred embodiment according to this invention, oxidic ores or iron oxides solids particles are contacted with upwardly flowing hydrogen-containing gases and a plurality of staged zones are provided. The zones contain fluidized beds operated at varying temperatures and the ore is at different stages of reduction. Also, the reducing gas in contact with the beds is at a different stage of oxidation within the zones. There is provided, in accordance with such embodiment, one or more ferric reduction zones operated at temperatures ranging from about 1000° F. to about 1800° F. and one or more ferrous reduction zones operated at temperatures ranging from about 1300° F. to about 1500° F. The alkaline earth metal oxides and carbonates may be added to the burning zone or to the ferric reduction zone which may also serve as a burning zone. The additive, however, is preferably added directly to the ferrous reduction zone, or zones.

The following nonlimiting examples and pertinent demonstrations bring out the more salient features and provide a better understanding of the invention.

A large quantity of raw Carol Lake ore is pulverized in an impact mill to particle size ranging from about 75 to 210 microns (65–200 mesh), and divided into several like portions. This ore is one well known as possessing a severe tendency to bog.

A portion of the ore is charged into a fluidized iron ore reactor or reduction process wherein is provided a series of four staged fluidized zones, two ferric reduction zones and two ferrous reduction zones. The ore is fluidized by an upwardly flowing gas initially sixty percent hydrogen and forty percent nitrogen. The gas flows from a zone containing an iron ore at a lower level of oxidation to the next higher level of oxidation, i.e., from the bottom to the top of the reactor. In the top ferric zone the partially oxidized gas is burned with air to provide heat to the various reduction stages. The reduced ore moves from the top to the bottom of the reactor and from one stage of reduction to the next. The ferric reduction stages, wherein ferric oxides are reduced essentially to magnetic oxides of iron, are operated at 1300° F. as are the ferrous reduction stages wherein the ferrous oxide is reduced, in the final stage, to provide 94 percent metallization.

Pursuant to operating at such conditions, the ferrous reduction beds showed signs of bogging within about ten minutes and are severely and totally bogged in only twenty minutes of continuous operation.

Example 1

The foregoing demonstration is repeated in precise detail employing a second portion of the ore except in this instance one percent of calcium oxide powder, based on the weight of iron ore feed, ground to a particle size distribution of about 80 to 200 microns (—65 to —200 mesh), is added to and continuously charged into the top or first burning ferric reduction zone. At the end of a twenty-four hour period, when the test is arbitrarily terminated, there is not the slightest evidence of bogging or of any tendency toward bogging. The beds appeared normal and the process functioned normally in every way. The improvement is thus at least a 7200 percent improvement over the foregoing demonstration, and clearly evidences the advantages of the present process. Morever, undesirable sulfides are essentially eliminated from the ore, and the iron ore product is improved to the extent that, after briquetting, it is ready for charging to a blast furnace without any necessity of adding a fluxing agent.

Example 2

When Example 1 is repeated with another portion of ore at a temperature of 1400° F. and calcium carbonate added in equivalent to a one percent concentration, there is yet no bogging or tendency toward bogging at the end of a twenty-four hour period.

In sharp contrast, however, when this demonstration is repeated at this high temperature without calcium carbonate addition, severe bogging occurs at the end of only eleven minutes.

These comparative data show, then, at 1400° F. at least about a 130-fold increase in operating time over a run wherein no agent is added to the process.

Example 3

When the temperature of operation of the process of Example 1 is further extended to 1570° F. and the same amount of calcium carbonate added to the process, there is no evidence of bogging at the end of a 180-minute period.

Example 4

When Example 1 is repeated except that magnesium carbonate is successively added to the process in 1.5, 3.0 and 5.0 percent concentrations, equally good benefits are also obtained. The tendency to bog is considerably reduced and operating time is significantly extended in each instance.

Further comparative data are set forth hereafter to show the advantages of the present novel classes of additives in inhibiting bogging. Also, the outstanding effectiveness of magnesium oxide (MgO) and magnesium carbonate, even as contrasted with calcium oxide (CaO), is shown. In the following runs, a different ore—viz., Cerro Bolivar ore—is employed. While the tendency of the ore to bog occurs at higher temperature than with the Carol Lake ore and the bogging tendency is somewhat less severe, nevertheless, in these runs the temperature is upped to an extremely high plateau—viz, 1600° F.—which would normally induce quite severe bogging.

In these runs a Cerro Bolivar ore is pulverized as in Example 1, divided into several portions, and separately reduced with a 60:40 hydrogen:nitrogen gaseous mixture. To certain of the ore portions is added calcium oxide and magnesium oxide in different states of fineness. A sufficiently high initial temperature, i.e., 1400° F., is selected so that the unit is on the verge of a bog. Upon the feeding of the ore portions into the process, the temperature is raised to 1600° F. Bogging then occurs after a time in most instances (37 minutes where no additive is employed), the results being shown in the table below.

| Example | Additive | Time to Bog, minutes |
|---|---|---|
|  | None | 37 |
| 5 | 1% Coarse CaO (Commercial Grade) (65 to 200 mesh). | 65 |
| 6 | 1% CaO (25% finer than 400 mesh) | 88 |
| 7 | 1% CaO (100% finer than 400 mesh) | 144 |
| 8 | 1% CaO (1 micron average particle size) | 245 |
| 9 | 0.1% MgO (1 micron average particle size) | 288 |
| 10 | 0.1% MgO (100% finer than 400 mesh) | *300+ |
| 11 | 0.2% MgCO₃ (100% finer than 400 mesh) | *285+ |
| 12 | 0.5% MgO (31% finer than 325 mesh) | *255+ |
| 13 | 1% MgO (31% through 325 mesh) | *645+ |
| 14 | 0.05% MgO (Less than 400 mesh) | 62 |

\* No bog at the end of the period shown, when the test is arbitrarily terminated.

These data clearly shows the tremendous effectiveness of very small particle size and also the far greater effectiveness of magnesium oxide (or carbonate) even as contrasted with calcium oxide which, in itself, is a superb additive. Thus, very fine magnesium oxide is more effective even at 0.1 percent concentration (Example 10 vis-a-vis Example 7) than calcium oxide or equivalent particle size at the 1 percent level. In fact, magnesium oxide at smaller particle size is even more effective, e.g., even at the 0.5 percent level, than a coarser commercial grade calcium oxide even at the 1 percent level, It is also shown that magnesium oxide approaches the lower threshold of effectiveness at the 0.05 percent level at these conditions.

It will be observed that magnesium carbonate has about the same effectiveness as about one-half the amount of magnesium oxide. The magnesium carbonate, it is believed, breaks down the magnesium oxide in the process and, of course, one part of the carbonate provides about one-half part of the corresponding oxide. It is believed, in fact, that all of the alkaline earth metal carbonates break down to the corresponding oxide after a relatively short induction period. Hence, any compound or material which will form a sufficiently fine alkaline earth metal oxide in situ in proper concentrations will provide benefits.

It is apparent that certain modifications and changes can be made in the present process without departing the spirit and scope of the invention. The key and novel features of the invention is the use of small and minor portions of alkaline earth metal oxides and carbonates, or precursors thereof, directly added to, premixed, or otherwise physically admixed with oxidic iron ores which are subjected to reduction in a fluidized process.

This discovery of inhibiting bogging in this relatively simple manner is indeed surprising for the results of chemical analyses are often reported as showing iron ores as containing certain alkaline earth metal oxides, e.g., calcium oxide and magnesium oxide. It is also known, however, that there is no relationship between the reported content of these substances within the ore and tendency to bog. In fact, a few selected data of runs are given to illustrate this phenomenon.

A series of runs was conducted on several different types of iron ore at 1300° F. for a period, when possible, of 4½ hours in a staged fluidized iron ore reactor as described in Example 1. The following table gives the results of those runs.

| Run No. | Ore | Calcium Oxide | Magnesium Oxide | Tendency to Bog |
|---|---|---|---|---|
| 1 | Hammersly | 0.01 | 0.01 | None. |
| 2 | Sibuguey | 0.23 | 0.11 | Do. |
| 3 | Cerro Bolivar | 0.01 | 0.02 | Slight. |
| 4 | Steep Rock | 0.17 | 0.06 | Do. |
| 5 | Wabana | 1.7 | 0.2 | Moderate. |
| 6 | Wabush | 0.03 | 0.01 | Slightly more than moderate. |
| 7 | Santa Ines | 2.7 | 1.4 | Total bog in 58 min. |
| 8 | Carol Lake | 0.22 | 0.22 | Total bog in 10 min. |

From these data it is clear that bound alkaline earth metal oxides or complexes provide no benefit to the process, and often ores containing the most alkaline earth metal oxides, or carbonates, are the most difficult to reduce without bogging. As will be noted by reference to the table, Carol Lake ore is such an ore, and certainly one would not expect the Santa Ines ore to have presented such difficulties if the bound calcium oxide and magnesium oxide had provided benefits.

It has been concluded and firmly established that the alkaline earth metal oxides and carbonates must be present in admixture with the fluidized ore at the time of reduction to provide benefits, whether added ab initio or generated in situ from an added material capable of providing compounds which can generate into alkaline earth metal oxides and carbonates.

Many commercial mixtures and naturally occurring materials which provide these compounds can also be added after pulverization to the process, e.g., limestone, dolomite, oyster shells, clam shells, and the like.

Having described the invention, what is claimed is:

1. In a process for production of sponge iron by direct reduction of particulate oxidic iron ores wherein ore is fed continuously to a series of fluidized zones including at least a ferric reduction zone and a ferrous reduction zone and wherein said ore descends through the series of zones and is progressively reduced to lower states of oxidation, the improvement comprising
   maintaining said reduction zones at temperatures ranging from about 1000° F. to about 1800° F.,
   and adding to said ferrous reduction zone a compound selected from the group consisting of calcium carbonate, calcium oxide, magnesium carbonate, magnesium oxide, mixtures and precursors thereof,
   said added compound being added in an amount, based on the ore feed, ranging from about 0.05 wt. percent to about 5 wt. percent of particles ranging in size less than about 48 mesh, to suppress bogging in said ferrous reduction zone.

2. The process of claim 1 wherein a ferrous reduction zone is maintained at temperatures ranging from about 1300° F. to about 1500° F.

3. The process of claim 2 wherein are added about 0.05 wt. percent to about 5 wt. percent of particles of said compound ranging in size less than about 325 mesh.

4. The process of claim 2 wherein are added about 0.1 wt. percent to about 1.5 wt. percent of particles of said compound ranging in size less than about 325 mesh.

5. In a process for the production of sponge iron by direct reduction of particulate oxidic iron ores wherein ore is fed continuously to a series of fluidized zones including at least a ferric reduction zone and a ferrous reduction zone and wherein said ore descends through the series of zones and is progressively reduced to lower states of oxidation, the improvement comprising
   maintaining said ferrous reduction zone at temperatures ranging from about 1300° F. to about 1500° F.,
   and adding to said ferrous reduction zone a compound selected from the group consisting of calcium carbonate, calcium oxide, magnesium carbonate, magnesium oxide, mixtures and precursors thereof,
   said added compound being added in an amount, based on the ore feed, ranging from about 0.1 wt. percent to about 1.5 wt. percent of particles ranging in size less than about 325 mesh, to suppress bogging in said ferrous reduction zone.

6. The process of claim 5 wherein said compound comprises magnesium carbonate.

7. The process of claim 5 wherein said compound comprises magnesium oxide.

References Cited

UNITED STATES PATENTS

| 3,341,322 | 9/1967  | Bailey         | 75—26   |
| 3,353,951 | 11/1967 | Shafer et al.  | 75—33 X |
| 3,020,149 | 2/1962  | Old et al.     | 75—26   |
| 3,062,639 | 11/1962 | Sterling       | 75—26   |
| 3,251,677 | 5/1966  | Jolley         | 75—26   |
| 1,971,112 | 8/1934  | Maier          | 75—33   |
| 2,080,028 | 5/1937  | Avery          | 75—33 X |
| 2,444,916 | 7/1948  | Cape et al.    | 75—34   |
| 2,476,920 | 7/1949  | Segura         | 75—26   |
| 2,550,609 | 4/1951  | Slater         | 75—26   |
| 2,671,765 | 3/1954  | McGrath        | 75—26 X |
| 2,758,021 | 8/1956  | Drapeau et al. | 75—26 X |
| 2,831,759 | 4/1958  | Osborn         | 75—26   |
| 2,871,115 | 1/1959  | Agarwal        | 75—26 X |
| 3,246,978 | 4/1966  | Porter et al.  | 75—26   |

HYLAND BIZOT, *Primary Examiner.*

DAVID L. RECK, *Examiner.*

H. W. TARRING, *Assistant Examiner.*